(12) United States Patent
Kim et al.

(10) Patent No.: US 8,785,049 B2
(45) Date of Patent: Jul. 22, 2014

(54) NEGATIVE ACTIVE MATERIAL FOR RECHARGEABLE LITHIUM BATTERY AND RECHARGEABLE LITHIUM BATTERY INCLUDING SAME

(75) Inventors: Bong-Chull Kim, Yongin-si (KR); Cheol-Hee Hwang, Yongin-si (KR); Dong-Yung Kim, Yongin-si (KR); Se-Ho Park, Yongin-si (KR); Hyun-Jun Choi, Yongin-si (KR); In-Ho Jung, Yongin-si (KR); Su-Ho Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 645 days.

(21) Appl. No.: 13/053,160

(22) Filed: Mar. 21, 2011

(65) Prior Publication Data

US 2012/0115033 A1    May 10, 2012

(30) Foreign Application Priority Data

Nov. 4, 2010  (KR) .................. 10-2010-0109158

(51) Int. Cl.
  *H01M 4/13*  (2010.01)
(52) U.S. Cl.
  USPC .............. 429/231.8; 429/218.1; 429/232; 252/503
(58) Field of Classification Search
  USPC .............. 429/231.8, 218.1, 232; 252/503
  See application file for complete search history.

(56) References Cited

U.S. PATENT DOCUMENTS

| | | | |
|---|---|---|---|
| 6,589,696 B2 | 7/2003 | Matsubara et al. | |
| 8,092,940 B2 * | 1/2012 | Tabuchi et al. | ............. 429/231.8 |
| 8,105,718 B2 | 1/2012 | Nakanishi et al. | |
| 2004/0033419 A1 | 2/2004 | Funabiki | |
| 2005/0136330 A1 | 6/2005 | Mao et al. | |
| 2006/0035149 A1 | 2/2006 | Nanba et al. | |
| 2006/0102472 A1 | 5/2006 | Bito et al. | |
| 2006/0166098 A1 | 7/2006 | Tabuchi et al. | |
| 2008/0193831 A1 | 8/2008 | Mah et al. | |
| 2009/0269669 A1 | 10/2009 | Kim et al. | |
| 2010/0136432 A1 | 6/2010 | Kim | |
| 2012/0021286 A1 | 1/2012 | Tabuchi et al. | |
| 2012/0037845 A1 | 2/2012 | Yamamoto et al. | |

FOREIGN PATENT DOCUMENTS

| | | |
|---|---|---|
| CN | 1650449 A | 8/2005 |
| CN | 101567438 A | 10/2009 |
| CN | 101572312 A | 11/2009 |
| EP | 2 104 175 A2 | 9/2009 |

(Continued)

OTHER PUBLICATIONS

EPO Office Action dated Mar. 15, 2013 issued in European Patent Application No. 111860227, 6 pages.

(Continued)

*Primary Examiner* — Laura Weiner
(74) *Attorney, Agent, or Firm* — Christie, Parker & Hale, LLP

(57) ABSTRACT

A negative active material for a rechargeable lithium battery includes a core including crystalline carbon, a metal nano particle and a $MO_x$ nano particle (where x is from 0.5 to 1.5, and M is Si, Sn, In, Al, or a combination thereof) disposed on the core surface, and a coating layer including an amorphous carbon surrounding the core surface, the metal nano particle and the $MO_x$ nano particle. A lithium rechargeable battery includes the negative active material.

15 Claims, 2 Drawing Sheets

(56) References Cited

FOREIGN PATENT DOCUMENTS

| | | |
|---|---|---|
| EP | 2 113 955 A1 | 11/2009 |
| JP | 2004-71542 A | 3/2004 |
| JP | 2004-182512 A | 7/2004 |
| JP | 2005-149946 | 6/2005 |
| JP | 2006-164960 A | 6/2006 |
| JP | 2007-311180 A | 11/2007 |
| JP | 2008-186732 A | 8/2008 |
| JP | 2009-181767 A | 8/2009 |
| JP | 2009-266795 A | 11/2009 |
| JP | 2010-129545 A | 6/2010 |
| KR | 10-2001-0113448 | 12/2001 |
| KR | 10-0646546 | 11/2006 |
| KR | 10-2007-0059829 A | 6/2007 |
| KR | 10-2008-0076075 | 8/2008 |
| KR | 10-2009-0034045 A | 4/2009 |
| KR | 10-2009-0114130 | 11/2009 |
| WO | WO 2010/007898 A1 | 1/2010 |

OTHER PUBLICATIONS

Machine English Translation of JP 2007-311180 A, 16 pages.
Machine English Translation of JP 2008-186732 A, 23 pages.
Machine English Translation of JP 2009-181767 A, 35 pages.
Machine English Translation of JP 2009-266795 A, 16 pages.
Japanese Office Action dated Jan. 8, 2013 issued in Japanese Patent No. 2011-086129, 2 pages.
Korean Office action dated dated Feb. 21, 2012 issued to Korean priority patent application No. 10-2010-0109158, 5 pages.
Extended European Search Report dated Feb. 21, 2012 issued to corresponding EP Patent Application No. 11186022.7, 6 pages.
Korean Patent Abstracts of KR Publication No. 10-2006-0087003 which corresponds to Korean Patent No. 10-0646546, 13 pages.
SIPO Office action dated Nov. 20, 2013, with English translation, for corresponding Chinese Patent application 201110335222.5, (13 pages).
SIPO Office action dated Apr. 22, 2014 in corresponding CN Application No. 201110335222.5, with English translation (9 pages).

* cited by examiner

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2010-0109158 filed in the Korean Intellectual Property Office on Nov. 4, 2010, the entire contents of which are incorporated herein by reference.

BACKGROUND

1. Field

This disclosure relates to a negative active material for a rechargeable lithium battery and a rechargeable lithium battery including the same.

2. Description of Related Art

Lithium rechargeable batteries have recently drawn attention as power sources for small portable electronic devices. They use organic electrolytic solutions and thus have twice the discharge voltage of conventional batteries using alkaline aqueous solutions, and accordingly have high energy density.

As the positive active material of a rechargeable lithium battery, lithium-transition element composite oxides capable of intercalating lithium (such as $LiCoO_2$, $LiMn_2O_4$, $LiNi_{1-x}Co_xO_2$ (0<x<1), and so on) have been used.

As the negative active material of a rechargeable lithium battery, various carbon-based materials (such as artificial graphite, natural graphite, and hard carbon) capable of intercalating and deintercalating lithium ions have been used. However, recent research has been conducted into non-carbon-based negative active materials (such as Si) in or to improve battery stability and capacity.

SUMMARY

Embodiments of the present invention provide a negative active material for a rechargeable lithium battery having improved cycle-life characteristics.

Other embodiments of the present invention provide a rechargeable lithium battery including the negative active material.

According to embodiments of the present invention, a negative active material for a rechargeable lithium battery includes a core, a metal nano particle and a $MO_x$ nano particle (in which x ranges from 0.5 to 1.5 and M is Si, Sn, In, Al, or a combination thereof). The core includes a crystalline carbon, and the $MO_x$ nano particle is disposed on the core surface. A coating layer including an amorphous carbon generally surrounds the core surface, the metal nano particle and the $MO_x$ nano particle.

The metal nano particle and the $MO_x$ nano particle are mixed in a weight ratio of about 9:1 to about 2:8.

The metal nano particle may include a metal selected from Si, Sn, In, Al, and combinations thereof.

The metal nano particle may have an average particle diameter of about 50 nm to about 800 nm, and the $MO_x$ nano particle may have an average particle diameter of about 50 nm to about 800 nm.

The coating layer may have a thickness of about 100 nm to about 2000 nm.

The metal nano particle may have a full width at half maximum (FWHM) of the X-ray diffraction angle (2θ) at the (111) plane ranging from about 0.3 degree (°) to about 0.9 degree (°), as measured using a CuKα ray.

The metal nano particle may have a full width at half maximum (FWHM) of the X-ray diffraction angle (2θ) at the (220) plane ranging from about 0.35 degree (°) to about 0.95 degree (°), as measured using a CuKα ray.

The core including the crystalline carbon may have at least one pore, and the metal nano particle, the $MO_x$ nano particle, or a mixture thereof may be present in the at least one pore.

The metal nano particle and the $MO_x$ nano particle may be included in an amount of about 3 wt % to about 30 wt % based on the entire amount of negative active material.

The core including the crystalline carbon may be included in an amount of about 60 wt % to about 95 wt % based on the entire weight of negative active material. The coating layer may be included in an amount of about 2 wt % to about 20 wt % based on the entire weight of negative active material.

The crystalline carbon may include natural graphite, artificial graphite, or a mixture thereof. The amorphous carbon may include soft carbon, hard carbon, mesophase pitch carbonized products, fired cokes, or a mixture thereof.

According to other embodiments of the present invention, a rechargeable lithium battery includes a negative electrode including the negative active material, a positive electrode including a positive active material, and a non-aqueous electrolyte.

The negative electrode may include the negative active material as a first negative active material, and may further include a carbon-based negative active material as a second negative active material. The first and the second negative active materials may be mixed in a ratio of about 5:95 wt % to about 95:5 wt %.

The negative active material for a rechargeable lithium battery according to embodiments of the present invention exhibit improved cycle-life characteristics.

DETAILED DESCRIPTION

Figure 1:
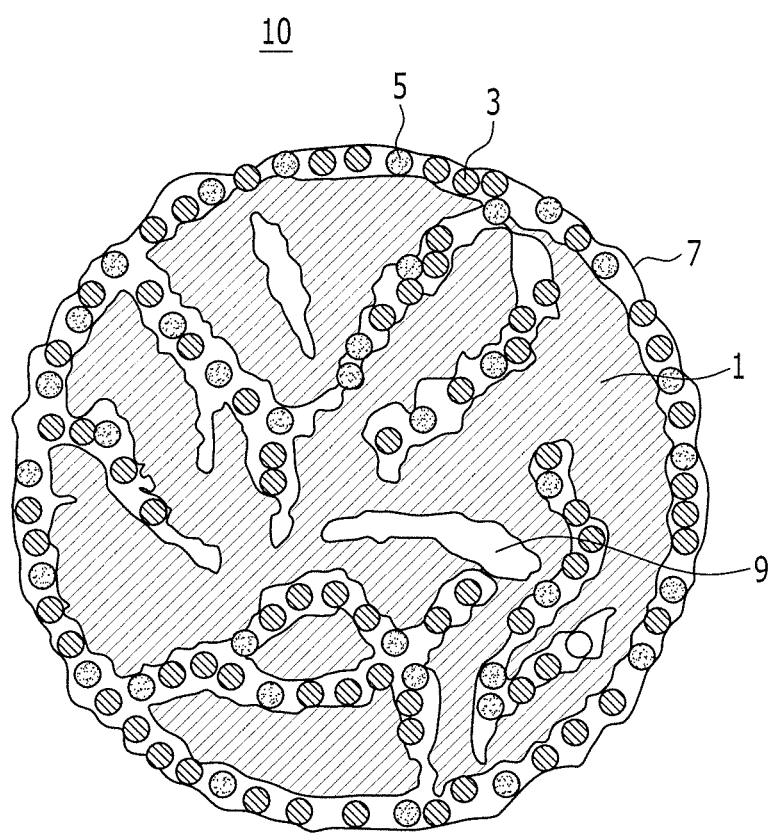
FIG. 1 is a schematic view of a negative active material according to an embodiment of the present invention.

Exemplary embodiments of the present invention will now be described. However, these embodiments are only exemplary, and the present invention is not limited thereto.

According to embodiments of the present invention, a negative active material for a rechargeable lithium battery includes a core, a metal nano particle, a MOx nano particle (where x is from 0.5 to 1.5, and M is Si, Sn, In, Al, or a combination thereof), and a coating layer. The core includes a crystalline carbon, and the $MO_x$ nano particle is disposed on the core surface. The coating layer includes an amorphous carbon generally surrounding the core surface, the metal nano particle and the $MO_x$ nano particle.

When the $MO_x$ nano particle disposed on the core surface includes a value for x that is outside of the 0.5 to 1.5 range, the resulting battery may not achieve improved cycle life retention and active material capacity per unit weight.

The metal nano particle may include a metal selected from Si, Sn, In, Al, and combinations thereof. As used herein, the term "metal" refers to a material having good thermo- or electric-conductivity, and non-limiting examples thereof include general metals (such as alkali metals), and semi-metals that are semi-conductive (such as Si).

The negative active material according to some embodiments may include both a metal nano particle and a $MO_x$ nano particle on the core surface. If only one of the metal nano particle or the $MO_x$ nano particle is present, improvements in battery cycle-life are insufficient. Particularly, improvements in cycle-life may be further enhanced when the metal nano particle and the $MO_x$ nano particle are mixed in a weight ratio of about 9:1 to about 2:8. When the metal nano particle and the $MO_x$ nano particle are mixed in this weight ratio range, cycle-life characteristics and battery capacity may be improved.

According to some embodiments, the metal nano particle and the $MO_x$ nano particle may be included in an amount of about 3 wt % to about 30 wt % based on the entire weight of the negative active material. The metal nano particle and the $MO_x$ nano particle may be disposed only on the core surface, or the metal nano particle and the $MO_x$ nano particle may be present both in the pore of the core and on the core surface. However, this range of amounts refers to the entire amount of the metal nano particle and the $MO_x$ nano particle present in the negative active material, regardless of their presence only on the core surface or both on the core surface and in the pore.

The metal nano particle may have an average particle diameter of about 50 nm to about 800 nm. The $MO_x$ nano particle may have an average particle diameter of about 50 nm to about 800 nm. When the metal nano particle and the $MO_x$ nano particle have average particle diameters within these ranges, volume expansion during charge and discharge may be suppressed, and cycle-life retention improved.

Since the coating layer generally surrounds (and in some embodiments completely surrounds) the core, the metal nano particle and the $MO_x$ nano particle (which are disposed on the core surface), the coating layer enables firmer attachment between the metal nano particle and the $MO_x$ nano particle. Accordingly, when the metal nano particle and the $MO_x$ nano particle undergo volume expansion during charge and discharge, the core (including crystalline carbon) may absorb more of the volume expansion.

The coating layer may have a thickness of about 100 nm to about 2000 nm.

The metal nano particle, particularly a Si nano particle, may have a FWHM of the X-ray diffraction angle ($2\theta$) at the (111) plane of about 0.3 degree (°) to about 0.9 degree (°), as measured using a CuKα ray. In addition, the metal nano particle, particularly a Si nano particle, may have a FWHM of the X-ray diffraction angle ($2\theta$) at the (220) plane of about 0.35 degree (°) to about 0.95 degree (°), as measured using a CuKα ray. When the metal nano particle has FWHMs within these range, the active material capacity efficiency may be improved.

The core including the crystalline carbon may be included in an amount of about 60 wt % to about 95 wt % based on the entire weight of the negative active material. The coating layer may be included in an amount of about 2 wt % to about 20 wt % based on the entire weight of the negative active material. The core including the crystalline carbon functions to compensate for the volume expansion of the metal nano particle and the $MO_x$ nano particle during charge and discharge, and to improve electric conductivity.

In addition, the core including the crystalline carbon may include at least one pore. When the pore is present in the core including the crystalline carbon, the compensation effect on the volume expansion of the metal nano particle and the $MO_x$ nano particle during charge and discharge is further improved. In addition, the metal nano particle, the $MO_x$ nano particle, or a mixture thereof may be present in the pore.

The crystalline carbon may include natural graphite, artificial graphite, or a mixture thereof, and the amorphous carbon may include soft carbon, hard carbon, mesophase pitch carbonized products, fired cokes, or a mixture thereof.

FIG. 1 is a schematic view of a negative active material according to embodiments of the present invention, but the structure of the negative active material is not limited to FIG. 1. As shown in FIG. 1, the negative active material 10 according to some embodiments includes a core 1 including a crystalline carbon, a metal nano particle 3 and a $MO_x$ nano particle 5 disposed on the core surface, and a coating layer 7 generally surrounding the core surface, the metal nano particle, and the $MO_x$ nano particle 5. Furthermore, at least one pore 9 is present in the core 1.

The negative active material according to some embodiments may be prepared by the following process. First, a metal nano particle and a $MO_x$ nano particle (where x is from 0.5 to 1.5, and M is Si, Sn, In, Al, or a combination thereof) are mixed. The metal nano particle may include Si, Sn, In, Al, or a combination thereof. The mixing process may be performed by any suitable method, such as ball milling, bead milling, attritor milling, or a combination of these processes.

The obtained particle mixture is mixed with crystalline graphite in a solvent. The solvent may include benzene, ethanol, methanol, or a combination thereof.

The obtained product may have a structure in which the metal nano particle and the $MO_x$ nano particle are present on the surface of a core of the crystalline graphite. The obtained product is then mixed with an amorphous carbon precursor in a solvent. The mixture is heat-treated. Nonlimiting examples of the amorphous carbon precursor include coal pitch, mesophase pitch, petroleum pitch, coal-based oil, petroleum-based heavy oil, and polymer resins (such as phenol resins, furan resins, polyimide resins, and the like). The solvent may be benzene, ethanol, methanol, or a combination thereof.

According to embodiments of the manufacturing process, the core (including a crystalline carbon), the metal nano particle, the $MO_x$ nano particle, and the amorphous carbon precursor may be mixed to provide an amount of amorphous carbon of about 2 wt % to about 20 wt % based on the entire amount of the negative active material, an amount of the crystalline carbon of about 60 wt % to about 95 wt %, and a combined amount of the metal nano particle and $MO_x$ nano particle of about 3 wt % to about 30 wt % (where the mixing ratio of the metal nano particle to the $MO_x$ nano particle is about 9:1 to about 2:8). However, the manufacturing process is not limited to these amounts and mixing ratios.

The mixture may be heat-treated at a temperature of about 800° C. to about 1100° C. for from about 0.5 hours to about 4 hours, and the heat treatment may be performed under a reduction atmosphere, such as $N_2$ or Ar. The amorphous carbon precursor is carbonized by the heat treatment, and thereby converted into the coating layer that includes amorphous carbon surrounding the core, and the metal nano particle and the $MO_x$ nano particle present on the core surface.

The negative active material prepared according to embodiments of the present invention may be used in a rechargeable lithium battery.

According to other embodiments of the present invention, a rechargeable lithium battery includes a negative electrode including a negative active material, a positive electrode including a positive active material, and a non-aqueous electrolyte.

The negative electrode includes a current collector and a negative active material layer formed on the current collector.

The negative active material layer includes a negative active material. The negative active material may be included in an amount of about 95 wt % to about 99 wt % based on the entire amount of the negative active material layer.

The negative active material may include the negative active material according to embodiments of the present invention. Alternatively, the negative active material may include a mixture of a first negative active material and second negative active material, in which the first negative active material include the negative active material according to embodiments of the present invention, and the second negative active material includes a conventional carbon-based negative active material. The first and the second negative active materials may be mixed in a ratio of about 5:95 wt % to about 95:5 wt %. The carbon-based negative active material of the second negative active material may include any carbon-based negative active material generally used in lithium ion secondary batteries, and nonlimiting representative examples thereof may include crystalline carbon, amorphous carbon, and mixtures thereof. The crystalline carbon may be unshaped, or may be sheet-shaped, flake-shaped, spherical, or fibrous natural graphite or artificial graphite. The amorphous carbon may be soft carbon, hard carbon, mesophase pitch carbonized products, fired coke, and so on.

When the negative electrode mixture includes a carbon-based active material as the second negative active material (for example, graphite, in which volume changes during charge and discharge are less), the electro-conductive passage (generated by volume changes in the metal nano particle included in the first negative active material) can be preserved.

The negative active material layer may include a binder, and optionally further include a conductive material. The negative active material layer may include from about 1 wt % to about 5 wt % binder based on the total weight of the negative active material layer. In addition, when the negative active material layer further includes a conductive material, the negative active material may include about 90 wt % to 98 wt % negative active material, about 1 wt % to about 5 wt % of the binder, and about 1 wt % to about 5 wt % conductive material.

The binder improves the binding properties of the active material particles with one another and with the current collector. The binder may include a non-water-soluble binder, a water-soluble binder, or a combination thereof.

Nonlimiting examples of the non-water-soluble binder include polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinylalcohol, sodium polyacrylate, copolymers including propylene and a C2 to C8 olefin, copolymers of (meth)acrylic acid and (meth)acrylic acid alkyl ester, and combinations thereof.

When the water-soluble binder is used as the negative electrode binder, a cellulose-based compound may be further added to provide viscosity. Nonlimiting examples of the cellulose-based compound include carboxymethyl cellulose, hydroxypropylmethyl cellulose, methyl cellulose, alkaline metal salts thereof, and combinations thereof. The alkaline metal may be Na, K, or Li. The cellulose-based compound may be included in an amount of about 0.1 to about 50 parts by weight based on 100 parts by weight of the binder.

As for the conductive material, any electro-conductive material that does not cause a chemical change may be used. Nonlimiting examples of the conductive material include carbon-based materials (such as natural graphite, artificial graphite, carbon black, acetylene black, ketjen black, and carbon fibers), metal-based materials (such as metal powders or metal fibers including copper, nickel, aluminum, and/or silver), conductive polymers (such as polyphenylene derivatives), and mixtures thereof.

The current collector may include a copper foil, a nickel foil, a stainless steel foil, a titanium foil, a nickel foam, a copper foam, a polymer substrate coated with a conductive metal, or a combination thereof.

The positive electrode includes a current collector and a positive active material layer disposed on the current collector. The positive active material may be a lithiated intercalation compound that reversibly intercalates and deintercalates lithium ions. For example, the positive active material may include a composite oxide including lithium and at least one of cobalt, manganese, and nickel. In particular, lithium-containing compounds represented by the following formulae may be used.

$Li_aA_{1-b}X_bD_2(0.90 \leq a \leq 1.8, 0 \leq b \leq 0.5)$ $Li_aA_{1-b}X_bO_{2-c}D_c(0.905 \leq a \leq 1.8, 0 \leq b \leq 0.5, 0 \leq c \leq 0.05)$ $Li_aE_{1-b}X_bO_{2-c}D_c(0.90 \leq a \leq 1.8, 0 \leq b \leq 0.5, 0 \leq c \leq 0.05)$ $Li_aE_{2-b}X_bO_{4-c}D_c(0.90 \leq a \leq 1.8, 0 \leq b \leq 0.5, 0 \leq c \leq 0.05)$ $Li_aNi_{1-b-c}Co_bX_cD_\alpha(0.90 \leq a \leq 1.8, 0 \leq b \leq 0.5, 0 \leq c \leq 0.05, 0 < \alpha \leq 2)$ $Li_aNi_{1-b-c}Co_bX_cO_{2-\alpha}T_\alpha(0.90 \leq a \leq 1.8, 0 \leq b \leq 0.5, 0 \leq c \leq 0.05, 0 < \alpha < 2)$ $Li_aNi_{1-b-c}Co_bX_cO_{2-\alpha}T_2(0.90 \leq a \leq 1.8, 0 \leq b \leq 0.5, 0 \leq c \leq 0.05, 0 < \alpha < 2)$ $Li_aNi_{1-b-c}Mn_bX_cD_\alpha(0.90 \leq a \leq 1.8, 0 \leq b \leq 0.5, 0 \leq c \leq 0.05, 0 < \alpha \leq 2)$ $Li_aNi_{1-b-c}Mn_bX_cO_{2-\alpha}T_\alpha(0.90 \leq a \leq 1.8, 0 \leq b \leq 0.5, 0 \leq c \leq 0.05, 0 < \alpha < 2)$ $Li_aNi_{1-b-c}Mn_bX_cO_{2-\alpha}T_2(0.90 \leq a \leq 1.8, 0 \leq b \leq 0.5, 0 \leq c \leq 0.05, 0 < \alpha < 2)$ $Li_aNi_bE_cG_dO_2(0.90 \leq a \leq 1.8, 0 \leq b \leq 0.9, 0 \leq c \leq 0.05, 0.001 \leq d \leq 0.1)$ $Li_aNi_bCo_cMn_dG_eO_2(0.90 \leq a \leq 1.8, 0 \leq b \leq 0.9, 0 \leq c \leq 0.5, 0 \leq d \leq 0.5, 0.001 \leq e \leq 0.1)$ $Li_aNiG_bO_2(0.90 \leq a \leq 1.8, 0.001 \leq b \leq 0.1); Li_aCoG_bO_2(0.90 \leq a \leq 1.8, 0.001 \leq b \leq 0.1)$ $Li_aMn_{1-b}G_bO_2(0.90 \leq a \leq 1.8, 0.001 \leq b \leq 0.1)$ $Li_aMn_2G_bO_4(0.90 \leq a \leq 1.8, 0.001 \leq b \leq 0.1)$ $Li_aMn_{1-g}G_gPO_4 (0.90 \leq a \leq 1.8, 0 \leq g \leq 0.5)$ $QO_2$ $QS_2$ $LiQS_2$ $V_2O_5$ $LiV_2O_5$ $LiZO_2$ $LiNiVO_4$ $Li_{(3-f)}J_2(PO_4)_3 (0 \le f \le 2)$ $Li_{(-f)}Fe_2(PO_4)_3 (0 \le f \le 2)$ $LiFePO_4$.

In the above formulae, A is selected from Ni, Co, Mn, and combinations thereof. X is selected from Al, Ni, Co, Mn, Cr, Fe, Mg, Sr, V, rare earth elements, and combinations thereof. D is selected from O, F, S, P, and combinations thereof. E is selected from Co, Mn and combinations thereof. T is selected from F, S, P, and combinations thereof. G is selected from Al, Cr, Mn, Fe, Mg, La, Ce, Sr, V, and combinations thereof. Q is selected from Ti, Mo, Mn, and combinations thereof. Z is selected from Cr, V, Fe, Sc, Y, and combinations thereof. J is selected from V, Cr, Mn, Co, Ni, Cu, and combinations thereof.

The compound may have a coating layer on the surface, or may be mixed with another compound having a coating layer. The coating layer may include at least one coating element compound selected from oxides of a coating element, hydroxides of a coating element, oxyhydroxides of a coating element, oxycarbonates of a coating element, and hydroxyl carbonates of a coating element. The compound for the coating layer may be amorphous or crystalline. Nonlimiting examples of the coating element for the coating layer include Mg, Al, Co, K, Na, Ca, Si, Ti, V, Sn, Ge, Ga, B, As, Zr, and mixtures thereof. The coating layer may be formed by any method that does not adversely influence the properties of the positive active material. For example, the method may include any coating method such as spray coating, dipping, and the like, which are well-known.

In the positive active material layer, the positive active material is included in an amount of about 90 wt % to about 98 wt % based on the total weight of the positive active material layer.

The positive active material layer may include a binder and a conductive material. The positive active material layer may include from about 1 wt % to about 5 wt % binder and from about 1 wt % to about 5 wt % conductive material based on the total weight of the positive active material layer.

The binder improves the binding properties of the positive active material particles to one another, and also with the current collector. Nonlimiting examples of the binder include polyvinylalcohol, carboxymethylcellulose, hydroxypropylcellulose, diacetylcellulose, polyvinylchloride, carboxylated polyvinylchloride, polyvinylfluoride, polymers including ethylene oxide, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, and combinations thereof.

The conductive material is included to improve electrode conductivity. Any electrically conductive material may be used as a conductive material so long as it does not cause a chemical change. Nonlimiting examples of the conductive material include carbon-based materials (such as natural graphite, artificial graphite, carbon black, acetylene black, ketjen black, carbon fibers, and the like), metal-based materials (such as metal powders or metal fibers including copper, nickel, aluminum, silver, and the like), conductive polymers (such as polyphenylene derivatives, and the like), and mixtures thereof.

The current collector may be an Al foil, but is not limited thereto.

The negative and positive electrodes may be fabricated by a method including mixing the active material, conductive material, and binder to form an active material composition, and coating the composition on a current collector. The electrode manufacturing method is well known. The solvent may be N-methylpyrrolidone, but is not limited thereto. When a water-soluble binder is used in the negative electrode, water may be used as the solvent during preparation of the negative active material composition.

In a rechargeable lithium battery according to some embodiments, a non-aqueous electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Nonlimiting examples of the ester-based solvent include methyl acetate, ethyl acetate, n-propyl acetate, dimethylacetate, methylpropionate, ethylpropionate, y-butyrolactone, decanolide, valerolactone, mevalonolactone, caprolactone, and so on. Nonlimiting examples of the ether-based solvent include dibutyl ether, tetraglyme, diglyme, dimethoxyethane, 2-methyltetrahydrofuran, tetrahydrofuran, and so on. Nonlimiting examples of the ketone-based solvent include cyclohexanone and so on. Nonlimiting examples of the alcohol-based solvent include ethyl alcohol, isopropyl alcohol, and so on. Nonlimiting examples of the aprotic solvent include nitriles (such as R—CN (wherein R is a C2 to C20 linear, branched, or cyclic hydrocarbon, a double bond, an aromatic ring, or an ether bond)), amides (such as dimethylformamide), dioxolanes (such as 1,3-dioxolane), sulfolanes, and so on.

A single non-aqueous organic solvent may be used, or a mixture of solvents may be used. When a mixture of organic solvents is used, the mixture ratio can be controlled in accordance with the desired battery performance.

The carbonate-based solvent may include a mixture of a cyclic carbonate and a linear carbonate. The cyclic carbonate and the chain carbonate are mixed together in a volume ratio of about 1:1 to about 1:9, and when such a mixture is used as an electrolyte, the electrolyte performance may be enhanced.

In addition, the electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 1.

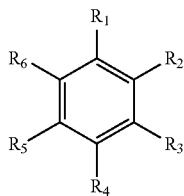

Chemical Formula 1

In Chemical Formula 1, each of $R_1$ to $R_6$ may be the same or different, and each is independently selected from halogens, C1 to C10 alkyls, C1 to C10 haloalkyls, and combinations thereof.

Nonlimiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include an additive selected from vinylene carbonate and ethylene carbonate-based compounds of the following Chemical Formula 2.

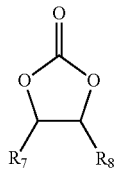

Chemical Formula 2

In Chemical Formula 2, each of $R_7$ and $R_8$ is the same or different, and each is independently selected from hydrogen, halogens, cyano groups (CN), nitro groups ($NO_2$), and fluorinated C1 to C5 alkyl groups, provided that at least one of $R_7$ and $R_8$ is selected from halogens, cyano groups (CN), nitro groups ($NO_2$), and fluorinated C1 to C5 alkyl groups, and $R_7$ and $R_8$ are not both hydrogen.

Nonlimiting examples of the ethylene carbonate-based compound include difluoroethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The additive improves cycle life and the amount used may be adjusted within an appropriate range.

The lithium salt supplies lithium ions in the battery, enables the basic operation of the rechargeable lithium battery, and improves lithium ion transport between the positive and negative electrodes. Nonlimiting examples of the lithium salt include supporting salts selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato) borate; LiBOB), and combinations thereof. The lithium salt may be used at a concentration of about 0.1 to 2.0M. When the lithium salt is included at a concentration within this range, electrolyte performance and lithium ion mobility may be enhanced due to optimal electrolyte conductivity and viscosity.

The rechargeable lithium battery may further include a separator between the negative electrode and the positive electrode, as needed. Nonlimiting examples of suitable separator materials include polyethylene, polypropylene, polyvinylidene fluoride, and multi-layers thereof (such as a polyethylene/polypropylene double-layered separator, a polyethylene/polypropylene/polyethylene triple-layered separator, and a polypropylene/polyethylene/polypropylene triple-layered separator).

Figure 2:
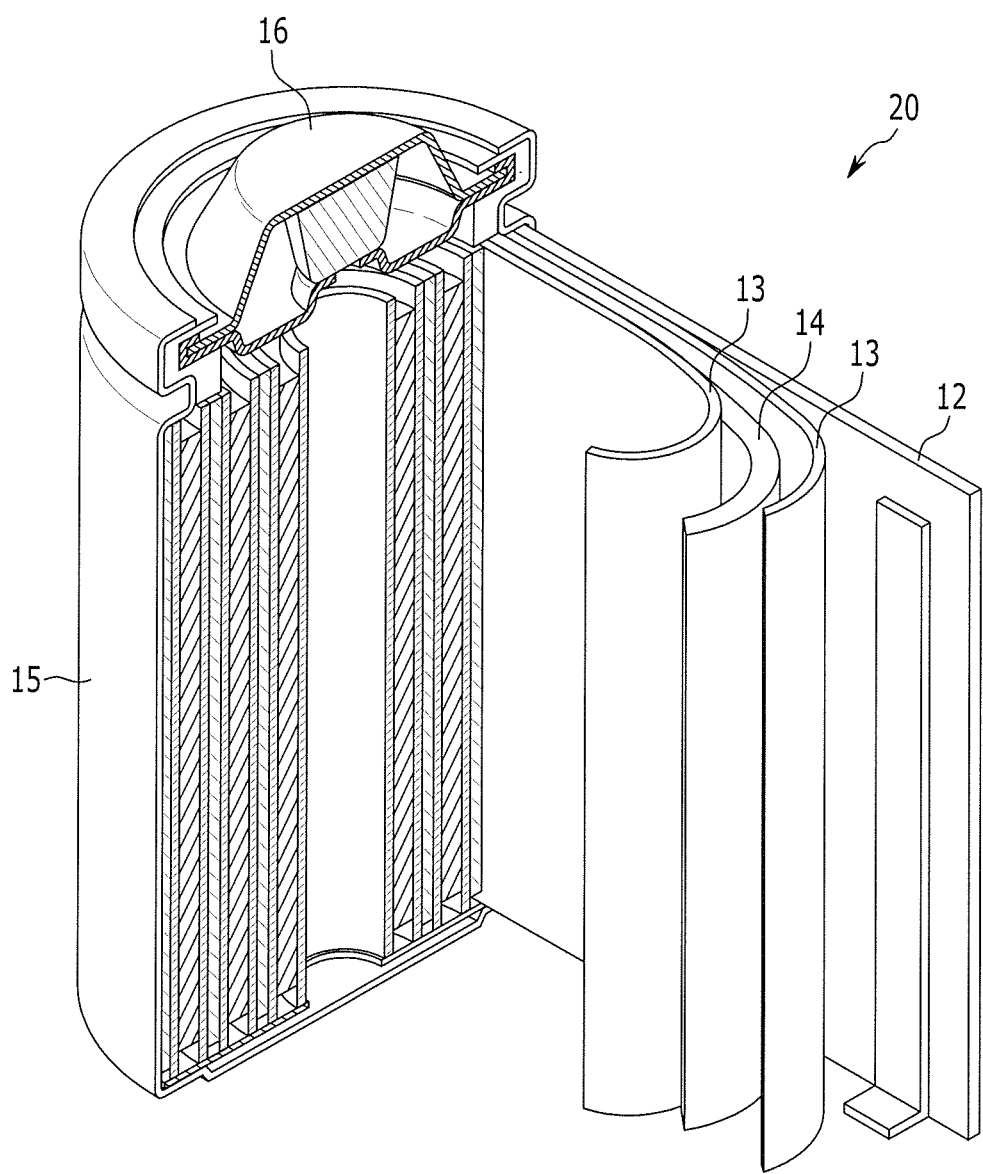
FIG. 2 is a cross-sectional perspective view of a rechargeable lithium battery according to an embodiment of the present invention.

FIG. 2 is a cross-sectional perspective view of a representative rechargeable lithium battery. As shown in FIG. 2, the rechargeable lithium battery 20 includes a battery case 15 including a positive electrode 14, a negative electrode 12, and a separator 13 between the positive electrode 14 and the negative electrode 12. An electrolyte solution is impregnated in the battery case 15, and a sealing member 16 seals the battery case 15.

The following examples are presented for illustrative purposes only, and do not limit the scope of the present invention.

Example 1

Si nano particles and $SiO_x$ (x=1) nano particles were mixed at a weight ratio of about 80:20 using a bead milling process.

The Si nano particles had a FWHM of the XRD angle (2θ) at the (111) plane of 0.33 degree (°) and a FWHM at the (220) plane of 0.38 degree (°) as measured using a CuKα ray. The Si nano particles had an average particle diameter of about 80 nm. The $SiO_x$ (x=1) nano particles had an average particle diameter of about 200 nm.

The obtained particle mixture and graphite were mixed in an ethanol solvent and dried. Accordingly, a product was obtained in which the Si nano particles and $SiO_x$ (x=1) nano particles were present on the graphite surface.

An amorphous carbon precursor was added into the product, and the mixture was heated at about 1000° C. for 2 hours under a nitrogen atmosphere.

From the process, a first negative active material was obtained including a graphite core and Si nano particles and $SiO_x$ (x=1) nano particles formed on the core, and an amorphous carbon coating layer surrounding the core surface and the Si nano particles and the $SiO_x$ (x=1) nano particles.

The first negative active material and artificial graphite as a second negative active material were mixed in a weight ratio of about 50:50 (wt %) to provide a negative active material.

Example 2

A negative active material was prepared as in Example 1, except that the Si nano particles and $SiO_x$ (x=1) nano particles were mixed in a ratio of 50:50 to provide the first negative active material.

Example 3

A negative active material was prepared as in Example 1, except that the Si nano particles and $SiO_x$ (x=1) nano particles were mixed in a ratio of 30:70 to provide the first negative active material.

Comparative Example 1

A negative active material was prepared as in Example 1, except that the $SiO_x$ (x=1) nano particles were not included in the first negative active material.

Example 4

A negative active material was prepared as in Example 1, except that Si nano particles having a FWHM of the XRD angle (2θ) at the (111) plane of 0.45 degree (°), a FWHM at the (220) plane of 0.5 degree (°) as measured using a CuKα ray, and an average particle diameter of about 100 nm were used to provide the first negative active material.

Example 5

A negative active material was prepared as in Example 4, except that the Si nano particles and the $SiO_x$ (x=1) nano particles were mixed in a ratio of 50:50 to provide the first negative active material.

Example 6

A negative active material was prepared as in Example 4, except that the Si nano particles and the $SiO_x$ (x=1) nano particles were mixed in a ratio of 30:70 to provide the first negative active material.

Comparative Example 2

A negative active material was prepared as in Example 4, except that the $SiO_x$ (x=1) nano particles were not used in the first negative active material.

Comparative Example 3

A negative active material was prepared as in Example 1, except that Si nano particles having a FWHM of the XRD angle (2θ) at the (111) plane of 0.25 degree (°), a FWHM at the (220) plane of 0.3 degree (°) as measured using a CuKα ray, and an average particle diameter of about 80 nm, were used, and $SiO_x$ (x=1) nano particles were not used to provide the first negative active material.

97 wt % of each of the negative active materials according to Examples 1 to 6 and Comparative Examples 1 to 3, 1 wt % of carboxymethyl cellulose, and 2 wt % of styrene butadiene rubber were mixed in a distilled water to provide negative active material slurries. Negative electrodes were obtained by coating each negative active material slurry on a Cu-foil current collector, and then drying and pressing the resultant.

96 wt % of a $LiCoO_2$ positive active material, 2 wt % of a polyvinylidene fluoride binder, and 2 wt % of a carbon black conductive material were mixed in N-methyl pyrrolidone to provide a positive active material slurry. The positive active material slurry was coated on an Al-foil current collector, and then dried and pressed to provide a positive electrode.

Cylindrical battery cells were prepared using the negative electrodes, the positive electrode, and an electrolyte. As the electrolyte, 1.5M of $LiPF_6$ dissolved in a mixed solvent of ethylene carbonate (EC), fluoroethylene carbonate (FEC), dimethyl carbonate (DMC), and diethyl carbonate (DEC) (5:25:35:35 volume ratio) was used.

The obtained cylindrical battery cells were charged and discharged at 1 C 100 times, and the ratio of capacity after the 100th discharge to the initial capacity (at first discharge) is shown in the following Table 1.

TABLE 1

| | Si FWHM at (111) plane | $Si/SiO_x$ (x = 1) weight ratio | 100th cycle-life |
|---|---|---|---|
| Comparative Example 1 | 0.33 | 100/0 | 80% |
| Example 1 | 0.33 | 80/20 | 85% |
| Example 2 | 0.33 | 50/50 | 88% |
| Example 3 | 0.33 | 30/70 | 90% |
| Comparative Example 2 | 0.45 | 100/0 | 85% |
| Example 4 | 0.45 | 80/20 | 90% |
| Example 5 | 0.45 | 50/50 | 92% |
| Example 6 | 0.45 | 30/70 | 93% |
| Comparative Example 3 | 0.25 | 100/0 | 70% |

As shown in Table 1, the cylindrical battery cells including the negative active materials according to Examples 1 to 3 have superior cycle-life characteristics as compared to the cells according to Comparative Example 1. In addition, the cylindrical battery cells including the negative active materials according to Examples 4 to 6 have superior cycle-life characteristics as compared to the cells according to Comparative Example 2.

Also, it was confirmed that Comparative Example 3 (including Si nano particles having a FWHM of 0.25 degree (°) and no $SiO_x$ (x=1) nano particles) has deteriorated cycle-life characteristics.

While this disclosure has been described in connection with certain exemplary embodiments, those of ordinary skill in the art would recognize that certain modifications and changes could be made to the described embodiments without departing from the spirit and scope of the present invention, as described in the appended claims.

What is claimed is:

1. A negative active material for a rechargeable lithium battery, comprising:
    a core comprising crystalline carbon;
    at least one metal particle and at least one $MO_x$ particle disposed on a surface of the core, wherein x is from about 0.5 to about 1.5, the metal particle comprises a metal selected from the group consisting of Si, Sn, In, Al, and combinations thereof, the metal particle has a FWHM of an X-ray diffraction angle (2θ) at a (111) plane of about 0.3 degrees (°) to about 0.9 degrees (°) as measured using a CuKα ray, and M is Si, Sn, In, Al, or a combination thereof; and
    a coating layer surrounding at least a portion of the core, the metal particle and the $MO_x$ particle, the coating layer comprising an amorphous carbon.

2. The negative active material for a rechargeable lithium battery of claim 1, wherein the metal particle and the $MO_x$ particle are mixed in a weight ratio of about 9:1 to about 2:8.

3. The negative active material for a rechargeable lithium battery of claim 1, wherein the metal particle has an average particle diameter of about 50 nm to about 800 nm.

4. The negative active material for a rechargeable lithium battery of claim 1, wherein the $MO_x$ particle has an average particle diameter of about 50 nm to about 800 nm.

5. The negative active material for a rechargeable lithium battery of claim 1, wherein the metal particle has a FWHM of a X-ray diffraction angle (2θ) at a (220) plane of about 0.35 degrees (°) to about 0.95 degrees (°) as measured using a CuKα ray.

6. The negative active material for a rechargeable lithium battery of claim 1, wherein the core has at least one pore.

7. The negative active material for a rechargeable lithium battery of claim 6, wherein the metal particle, or the $MO_x$ particle, or a mixture of the metal particle and the $MO_x$ particle is present in the pore.

8. The negative active material for a rechargeable lithium battery of claim 1, wherein the metal particle and the $MO_x$ particle are included in a combined amount of about 3 wt % to about 30 wt % based on the entire weight of the negative active material.

9. The negative active material for a rechargeable lithium battery of claim 1, wherein the core is included in an amount of about 60 wt % to about 95 wt % based on the entire weight of the negative active material.

10. The negative active material for a rechargeable lithium battery of claim 1, wherein the crystalline carbon comprises a material selected from the group consisting of natural graphite, artificial graphite, and mixtures thereof.

11. The negative active material for a rechargeable lithium battery of claim 1, wherein the coating layer is included in an amount of about 2 wt % to about 20 wt % based on the entire weight of the negative active material.

12. The negative active material for a rechargeable lithium battery of claim 1, wherein the amorphous carbon comprises a material selected from the group consisting of soft carbon, hard carbon, mesophase pitch carbonized products, fired cokes, and mixtures thereof.

13. A rechargeable lithium battery comprising:
a negative electrode comprising a first negative active material comprising the negative active material of claim 1;
a positive electrode comprising a positive active material; and
a non-aqueous electrolyte.

14. The rechargeable lithium battery of claim 13, wherein the negative electrode further comprises a second negative active material comprising a carbon-based negative active material.

15. The rechargeable lithium battery of claim 14, wherein the first negative active material and the second negative active material are mixed in a ratio of about 5:95 wt % to about 95:5 wt %.

* * * * *